United States Patent
Sugimoto et al.

(10) Patent No.: US 8,866,942 B2
(45) Date of Patent: Oct. 21, 2014

(54) AUTO FOCUS ADJUSTING DEVICE AND METHOD AND RECORDING MEDIUM OF THE SAME METHOD

(75) Inventors: Kazuhiko Sugimoto, Seongnam-si (KR); Sung-shik Ko, Seoul (KR); Jin-ok Ha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 787 days.

(21) Appl. No.: 13/020,129

(22) Filed: Feb. 3, 2011

(65) Prior Publication Data

US 2011/0187905 A1 Aug. 4, 2011

(30) Foreign Application Priority Data

Feb. 4, 2010 (KR) .................. 10-2010-0010502

(51) Int. Cl.
*H04N 5/202* (2006.01)
*H04N 5/232* (2006.01)

(52) U.S. Cl.
CPC .................... *H04N 5/202* (2013.01)
USPC .................................... 348/254; 348/345

(58) Field of Classification Search
CPC ... H04N 5/202; H04N 5/23212; H04N 5/235; H04N 5/2351; H04N 5/2354; H04N 4/202; H04N 5/243; H04N 9/69
See application file for complete search history.

(56) References Cited

U.S. PATENT DOCUMENTS

| | | | |
|---|---|---|---|
| 2002/0080261 A1* | 6/2002 | Kitamura et al. | 348/349 |
| 2008/0225158 A1* | 9/2008 | Ito | 348/349 |
| 2009/0256935 A1* | 10/2009 | Endo et al. | 348/254 |
| 2009/0279192 A1* | 11/2009 | Harada et al. | 359/825 |

* cited by examiner

*Primary Examiner* — Luong T Nguyen
(74) *Attorney, Agent, or Firm* — Drinker Biddle & Reath LLP

(57) ABSTRACT

Provided are an auto focus adjusting device, method, and a recording medium storing a program product for executing the auto focusing method. The method includes: deriving an input image from an image capturing device by changing a position of a focus lens; deriving a gamma correction image by applying a gamma curve to the input image; and deriving an auto focus (AF) value about a position of a focus lens through the gamma correction image.

19 Claims, 12 Drawing Sheets

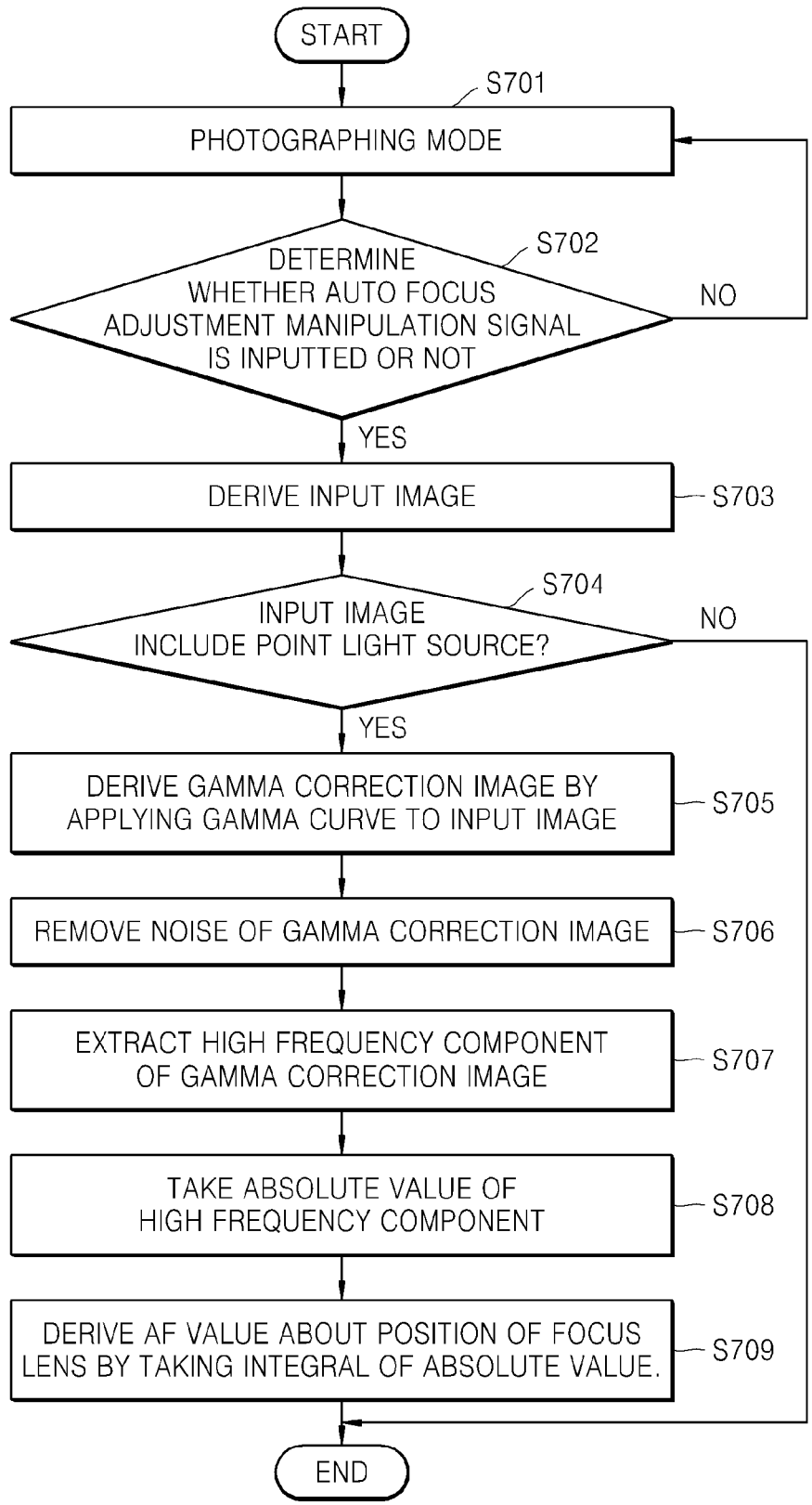

US 8,866,942 B2

AUTO FOCUS ADJUSTING DEVICE AND METHOD AND RECORDING MEDIUM OF THE SAME METHOD

CROSS-REFERENCE TO RELATED PATENT APPLICATION

This application claims the benefit of Korean Patent Application No. 10-2010-0010502, filed on Feb. 4, 2010, in the Korean Intellectual Property Office, the entire disclosure of which is incorporated herein by reference.

BACKGROUND

1. Field of the Invention

Embodiments of the invention relate to an auto focus adjusting device and method, and a program product for executing the auto focusing method, and more particularly to auto focusing when a point light source is included in an image.

2. Description of the Related Art

Often digital photographing devices use an auto focus control technique to obtain a clear image of a subject.

An auto focus (AF) value may be computed for an input image for different positions of a focus lens to generate an AF value graph. Then, a focus lens position is determined by determining the focus lens position with a maximum AF value. An image is then captured with the focus lens in the position with the maximum AF value.

However, it is difficult to calculate an accurate AF value for an image that includes a point light source in a dark environment, which often results in a blurry image.

SUMMARY

Therefore, there is a need in the art for an auto focus adjusting device and method for obtaining a captured image in focus with respect to an input image including a point light source in a dark environment and a recording medium storing a program for executing the auto focusing method.

According to embodiments of the invention, there is provided an auto focus adjusting method including: deriving an input image including a point light source from an image capturing device by changing a position of a focus lens; deriving a gamma correction image by applying a gamma curve to the input image; and deriving an auto focus (AF) value about a position of a focus lens through the gamma correction image.

The method may include removing noise of the gamma correction image.

The gamma curve may be non-linear.

The gamma curve may be expressed as $$s = cr^\gamma,$$

wherein s is a brightness of the gamma correction image, c is a positive number, r is a brightness of the input image, and $\gamma(0<\gamma<1)$ is an adjustment.

The input image may include a spotlight.

The input image may be a live-view image.

The method may further include determining whether the input image includes a spotlight or not.

The determining of whether the input image comprises a spotlight or not may include: generating a histogram that expresses a pixel frequency about brightness of the input image; and determining the input image as an image including a point light source in a dark environment when there is a peak only in low brightness and high brightness in the histogram.

The removing of noise of the gamma correction image may include removing noise through coring.

The deriving of the AF value about the position of the focus lens through the gamma correction image may include: extracting a high frequency component of the gamma correction image; taking an absolute value of the high frequency component; and deriving the AF value about the position of the focus lens by taking an integral of the absolute value.

The extracting of the high frequency component may include extracting a high frequency component with a high pass filter (HPF) of which a cutoff frequency is a high frequency.

According to another aspect of the invention, there is provided a computer program product, comprising a computer-readable medium, comprising: a code portion for changing a position of a focus lens and deriving an input image including a point light source from an image capturing device; a code portion for deriving a gamma correction image by applying a gamma curve to the input image; and a code portion for deriving an auto focus (AF) value about a position of a focus lens through the gamma correction image.

According to another aspect of the invention, there is provided an auto focus adjusting device including: a control unit for deriving an input image including a point light source from an image capturing device by changing a position of a focus lens; a gamma correction unit for deriving a gamma correction image by applying a gamma curve to the input image; and an AF value deriving unit for deriving an AF value about a position of a focus lens through the gamma correction image.

The auto focus adjusting device may include a filter unit for removing noise of the gamma correction image.

The gamma curve may be non-linear.

The gamma curve may be expressed as $$s = cr^\gamma,$$

wherein s is a brightness of the gamma correction image, c is a positive number, r is a brightness of the input image, and $\gamma(0<\gamma<1)$ is an adjustment.

The input image may include a spotlight.

The input image may be a live-view image.

The device may further include a point light source image determining unit for determining whether the input image comprises a spotlight or not.

The point light source image determining unit may include: a histogram generating unit for generating a histogram that expresses a pixel frequency about brightness of the input image; and a determination unit for determining the input image as an image including a point light source in a dark environment when there is a peak only in low brightness and high brightness in the histogram.

The filter unit may remove noise through coring.

The AF value deriving unit may include: a high frequency component extracting unit for extracting a high frequency component of the gamma correction image; an absolute value deriving unit for taking an absolute value of the high frequency component; and an integral unit for deriving an AF value about the position of the focus lens by taking an integral of the absolute value.

The high frequency component extracting unit is an HPF of which a cutoff frequency is a high frequency.

BRIEF DESCRIPTION OF THE DRAWINGS

The above and other features and advantages of embodiments of the invention will become more apparent by describing in detail exemplary embodiments thereof with reference to the attached drawings in which:

FIG. 7 is a flowchart illustrating an auto focus adjusting method according to an embodiment of the invention;

DETAILED DESCRIPTION

Figure 1:
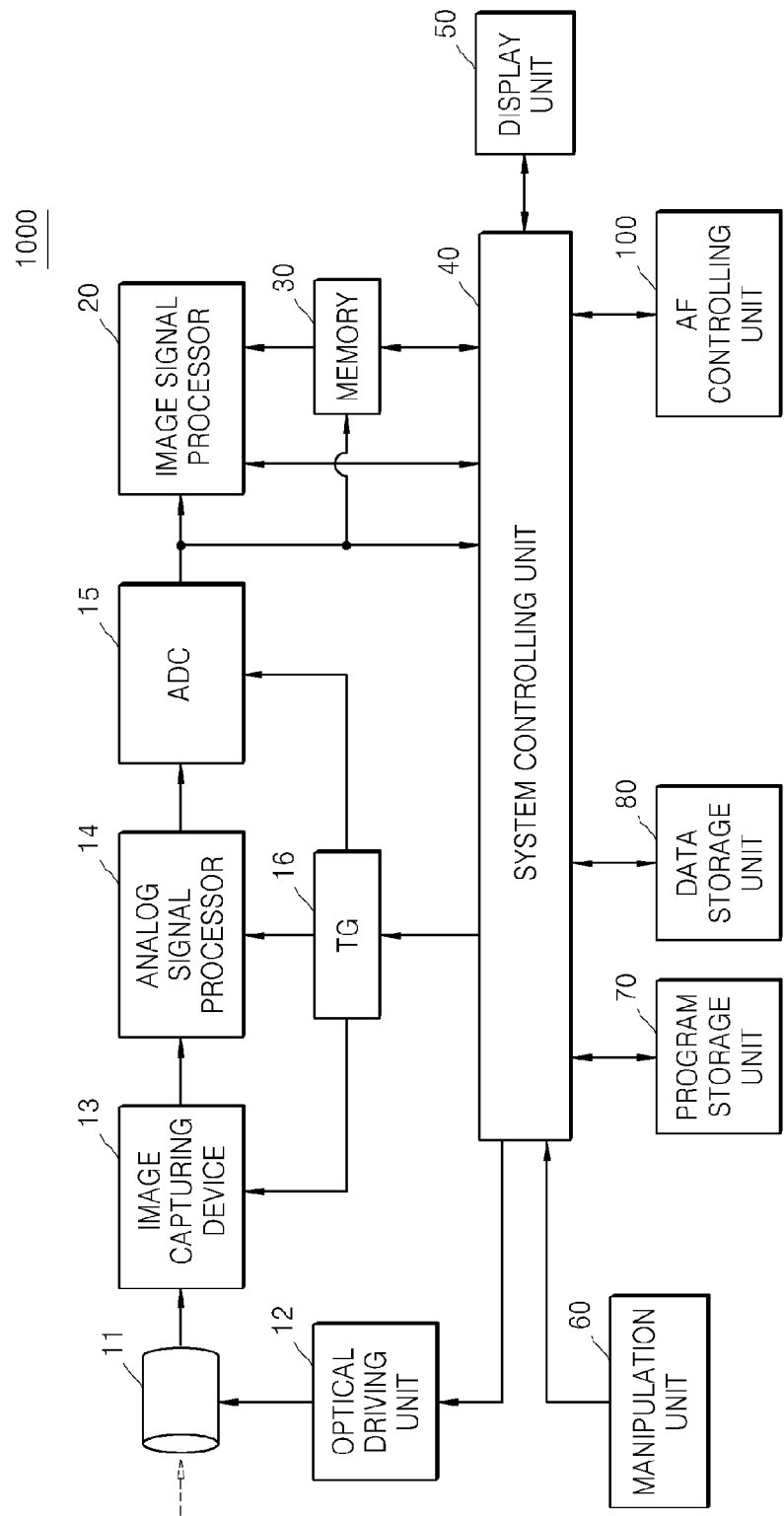
FIG. 1 is a view of a digital photographing device as one example of an auto focus adjusting device, according to an embodiment of the invention.

Hereinafter, embodiments of the invention will be described in detail by explaining embodiments of the invention with reference to the attached drawings. However, this does not limit embodiments of the invention within specific embodiments and it should be understood that embodiments of the invention cover all the modifications, equivalents, and replacements within the idea and technical scope of embodiments of the invention. Moreover, detailed descriptions related to well-known functions or configurations will not be described in order not to unnecessarily obscure subject matters of embodiments of the invention.

It will be understood that although the terms of first and second are used herein to describe various elements, these elements should not be limited by these terms. Terms are only used to distinguish one component from other components.

In the following description, the technical terms are used only for explaining a specific exemplary embodiment while not limiting embodiments of the invention. The terms of a singular form may include plural forms unless referred to the contrary. The meaning of 'comprises' and/or 'comprising' specifies a property, a region, a fixed number, a step, a process, an element and/or a component but does not exclude other properties, regions, fixed numbers, steps, processes, elements and/or components.

Embodiments of the invention may be represented with functional block configurations and various processing steps. These functional blocks may be realized with a different number of hardware or/and software components for executing specific functions. For example, embodiments of the invention may adopt integrated circuit components such a memory, processing, logic, a look-up table, which may execute various functions by control of at least one microprocessor or other control devices. As the components of embodiments of the invention are executed by software programming or software components, embodiments of the invention may be realized by programming languages such as C, C++, Java, and assembler or scripting languages, with diverse algorithms realized with data structures, processors, routines, or other programming components. Functional aspects may be realized with an algorithm executed by at least one processor. In addition, embodiments of the invention may adopt a typical technique for electronic environmental setting, signal processing, and/or data processing. Terms such as mechanism, components, means, and configuration may be broadly used and are not limited to mechanical and physical components. The terms may mean a series of routines of software in connection to a processor.

Hereinafter, embodiments of the invention are described in more detail with reference to the accompanying drawings and, while describing of the accompanying drawings, like reference numerals in the drawings denote like elements. Therefore, its overlapping description will be omitted.

FIG. 1 is a view of a digital camera 1000 as an example of an auto focus adjusting device according to an embodiment of the invention.

A digital camera 1000 is described as one example of the auto focus adjusting device. However, the auto focus adjusting device is not limited to the digital camera 1000 and may be applied to digital photographing devices such as a camera phone, a personal digital assistant (PDA) and a portable multimedia player (PMP) with a digital photographing function.

Referring to FIG. 1, the digital camera 1000 includes an optical unit 11 for receiving an optical signal from a subject, an optical driving unit 12 for driving the optical unit 11, an image capturing device 13 for converting an optical signal inputted through the optical unit 11 into an electrical signal, an analog signal processor 14 for receiving an electrical signal corresponding to one frame image from the image capturing device 13 and performing signal processing, such as noise reduction processing, on the electrical signal, and an analog-to-digital converter (ADC) 15 for converting an analog signal into a digital signal. In addition, the digital camera 1000 further includes a timing generator (TG) 16 for supplying a timing signal to the image capturing device 13, the analog signal processor 14, and the ADC 15. The digital camera 1000 further includes an image signal processor 20 for performing image signal processing on image data provided from the ADC 15. The image data may be inputted into the image signal processor 20 in real-time but, after being temporarily stored in a memory 30, may be supplied to the image signal processor 20, if necessary. In addition, the digital camera 1000 includes a manipulation unit 60 for receiving a manipulation signal from a user, a display unit 50 for displaying an image, a program storage unit 70 for storing a program related to an operation of the digital camera 100, and a data storage unit 80 for storing image data and predetermined information. Moreover, the digital camera 1000 includes an Auto Focus (AF) controlling unit 100 for automatically auto-focusing on an inputted image. The AF controlling unit 10 will be described in more detail with reference to the drawings. Also, the digital camera 1000 includes a system controlling unit 40 for generally controlling each component according to a manipulation signal from a user or an inputted image.

Each component of the digital camera 100 is illustrated as a separate block in the present embodiment. However, embodiments of the invention is not limited thereto and may include one chip integrated with more than two components. Furthermore, a component for performing more than two functions may be configured with more than two separate chips according to a corresponding function.

Hereinafter, each component will be described in more detail.

The optical unit 11 may include at least one lens for collecting an optical signal, an aperture for adjusting the quantity of the optical signal (quantity of light), and a shutter for controlling the input of an optical signal. The lens includes a zoom lens for controlling a viewing angle to be narrow or wide according to a focal length and a focus lens for focusing a subject, and theses lenses may be configured each with one lens or a group of lenses. A mechanical shutter of which a screen moves vertically may be used as the shutter. In addition, instead of a separate shutter device, the controlling of the supply of an electrical signal to the image capturing device 13 may serve as a shutter.

The optical driving unit 12 for driving the optical unit 11 may drive the lens position, the aperture, and the shutter in order to perform operations such as auto focus, auto exposure adjustment, aperture adjustment, and focus change. The optical driving unit 12 controls the driving of the optical unit 11 by receiving a control signal from the AF controlling unit 100 or the system controlling unit 40. The AF controlling unit 100 derives an AF value when a subject is in focus and derives the distance of a subject corresponding to the AF value. Also, the AF controlling unit 100 determines and provides position information of the lens corresponding to the distance of the subject in order to drive the lens of the optical unit 11. Accordingly, the optical unit 11 obtains an image when the subject is in focus.

The image capturing device 13 receives an optical signal from the optical unit 11 and forms an image of the subject. A Complementary Metal-Oxide Semiconductor (CMOS) sensor array or a Charge-coupled device (CCD) sensor array may be used as the image capturing device 13. The image capturing device 13 may provide image data corresponding to one frame image according to a timing signal supplied from the TG 16.

The analog signal processor 14 may include a circuit for performing signal processing (gain adjustment or waveform shaping) on an electrical signal provided from the image capturing device 13.

An electrical signal supplied from the analog signal processor 14 is an analog signal and the analog signal is converted into a digital signal by the ADC 15 to generate image data constituting an image of one frame.

The image signal processor 20 may reduce noise of inputted image data and perform image signal processing for image quality improvement such as gamma correction, color filter array interpolation, color matrix, color correction, and color enhancement. In addition, an image file may be generated by compressing image data generated by performing image signal processing for image quality improvement or the image data may be restored from the image file. A compression format of an image may be a reversible format or an irreversible format. As an appropriate example, the compression format may be a Joint Photographic Experts Group (JPEG) format or a JPEG 2000 format. The compressed image file may be stored in a data storage unit 80. In addition, the image signal processor 20 may functionally perform color processing, blur processing, edge enhancement processing, image interpretation processing, image recognition processing, and image effect processing. The image recognition processing performs face and scene recognition processing. Moreover, the image signal processor 20 may perform display image signal processing to display an image on the display unit 50. For example, the image signal processor 20 may perform brightness level adjustment, color correction, contrast adjustment, outline enhancement adjustment, screen split processing, generating of a character image, and composition processing of an image. The image signal processor 20 is connected to an external monitor and may perform predetermined image signal processing to display an image on the external monitor and may control to display a corresponding image on the external monitor by transmitting the processed image data.

Image data supplied from the ADC 15 may be transmitted to the image signal processor 20 in real-time, or may be supplied to the image signal processor 20 after temporarily storing the image data in the memory 30 if there is a difference between the transfer speed and operation processing speed. Memory devices, such as a synchronous dynamic random access memory (SDRAM), a Multi Chip Package (MCP) memory, and a dynamic random access memory (DRAM), may be used as the memory 30.

Image data on which a predetermined image signal processing is performed by the image signal processor 20 may be stored in the data storage unit 80. The data storage unit 80 may be configured with a device integrated with or detachable from a digital photographing device. For example, the data storage unit 80 may include a Secure Digital Memory Card (SDcard)/a Multi-Media Card (MMC), a Hard Disk Drive (HDD), an optical disk, an optical magnetic disk, and a hologram memory.

The image signal-processed image data is transmitted to the display unit 50 to realize a predetermined image. The display unit 50 may include display devices, such as a liquid crystal display (LCD) device, an organic light emitting diode (OLED) device, an electrophoresis display (EDD), and a plasma display panel (PDP) device.

The program storage unit 70 may store an operating system (OS) and application programs necessary for an operation of the digital camera 100. The program storage unit 70 may use an Electrically Erasable Read Only Memory (EEPROM), a flash memory, and a read only memory (ROM).

The manipulation unit 60 may include an element for allowing a user to manipulate the digital photographing device or perform various configurations during photographing. For example, the manipulation unit 60 may be realized with forms such as buttons, a key pad, a touch panel, a touch screen, and a dial and may input user manipulation signals for powering on/off, photographing start/stop, playing start/stop/search, driving of an optical unit, a mode change, a menu operation, and a selection operation.

The system controlling unit 40 controls each component according to a program stored in the program storage unit 70 or generally controls each component according to a user manipulation signal from the manipulation unit 60, an inputted image, and an image processing result of the image signal processor 20.

In addition, embodiments of the invention includes the AF controlling unit 100 for automatically focusing an input image.

Figure 2:
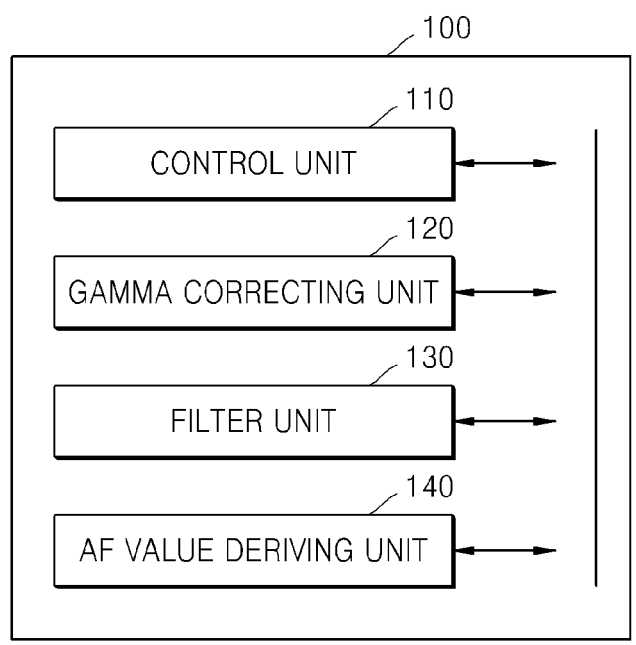
FIG. 2 is a block diagram illustrating the AF controlling unit 100 of the digital camera 1000 of FIG. 1, according to an embodiment of the invention.

FIG. 2 is a block diagram illustrating the AF controlling unit 100 of the digital camera 1000 of FIG. 1, according to an embodiment of the invention.

Referring to FIG. 2, the AF controlling unit 100 includes a control unit 110, a gamma correcting unit 120, a filter unit 130, and an AF value deriving unit 140.

The control unit 110 controls the optical driving unit 12 to change a position of the focus lens (not shown) and derives an input image from the image capturing device 13. The input image may be derived in a plurality based on a position change of the focus lens. In addition, the control unit 110 receives a manipulation signal generated when a user half-presses a shutter-release button of the manipulation unit 60 and derives an input image by changing a position of the focus lens. Here, the input image may be a live-view image. In addition, the input image may include a point light source.

The gamma correcting unit 120 derives a gamma correction image by applying a gamma curve to the input image. Here, the gamma curve may be previously stored in the program storage unit 70. The gamma curve may be non-linear and is expressed as the following Equation 1.

$$s = cr^\gamma \quad \text{[Equation 1]}$$

where s is brightness of a gamma correction image, c is a positive number, and r is brightness of an input image. The brightness may be expressed in a range of level 0 to level 255. In addition, the gamma curve according to an embodiment of the invention includes γ, which is a positive number (0<γ<1).

If the gamma curve is applied to an input image, a high brightness component of the input image is compressed and is expressed in a gamma correction image. This means that a point light source in the input image is reduced. In addition, a low brightness component of the input image is extended and expressed in a gamma correction image. This means that a low brightness signal component of the input image and also a noise component are expanded. Accordingly, the noise is necessarily reduced.

The filter unit 130 removes the noise of the gamma correction image. The filter unit 130 may remove the noise through coring. In detail, the coring is performed as described as follows. The filter unit 130 removes a signal component within a reference range from the inputted gamma correction image and outputs the remaining signal. Here, the reference range is set during a manufacturing process of the filter unit 130. That is, the coring process means a process for removing a signal component corresponding to noise.

The AF value deriving unit 140 derives an AF value about a position of the focus lens by analyzing the gamma correction image. The AF value deriving unit 140 may derive an AF value graph through a repetitive operation. Here, the AF value is related to how accurately a subject is focused in a corresponding position of the focus lens. For example, an AF value may be obtained by analyzing edge information of the input image after deriving the input image based on a position of the focus lens. Here, a position of the focus lens is determined according to the type of a digital photographing device and may be expressed in a range of level 0 and level 20 by one level. Here, the level 0 may represent that a focus lens is positioned the farthest from a subject and the level 20 may represent that a focus lens is positioned the closest to a subject. However, the level is not limited thereto and may be determined during the manufacturing of a device.

Figure 3:
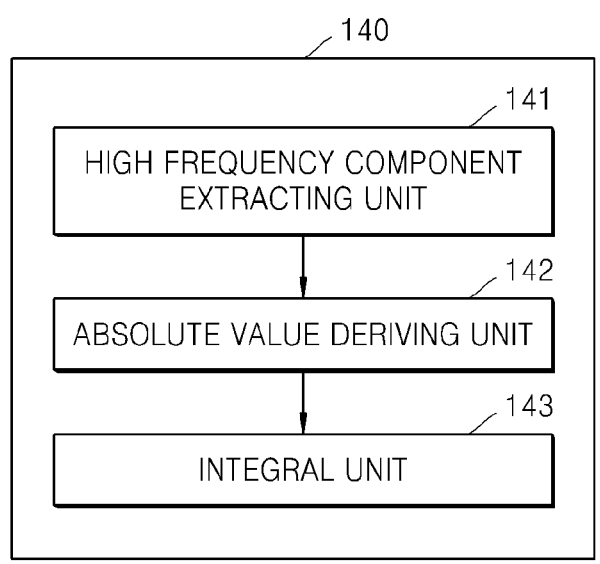
FIG. 3 is a detailed view of the AF value deriving unit 140 of the AF controlling unit 100 of FIG. 1, according to an embodiment of the invention.

FIG. 3 is a detailed view of the AF value deriving unit 140 of the AF controlling unit of FIG. 1, according to an embodiment of the invention.

Referring to FIG. 3, the AF value deriving unit 140 includes a high frequency component extracting unit 141 for extracting a high frequency component of a gamma correction image inputted from the filter unit 130, an absolute value deriving unit 142 for taking an absolute value of the extracted high frequency component, and an integral unit 143 for taking an integral of the absolute value. The AF value deriving unit 140 derives an AF value for a position of the focus lens. Here, the high frequency component extracting unit 141 may use a high pass filter (HPF) that passes a high frequency component and removes a low frequency component based on a cutoff frequency. According to another embodiment of the invention, the high pass filter having a high cutoff frequency is used. That is, with a high cutoff frequency, a fake peak due to a light source component occurring in a low frequency band is removed, and thus an inappropriate AF value caused by the fake peak is not derived.

Figure 4:
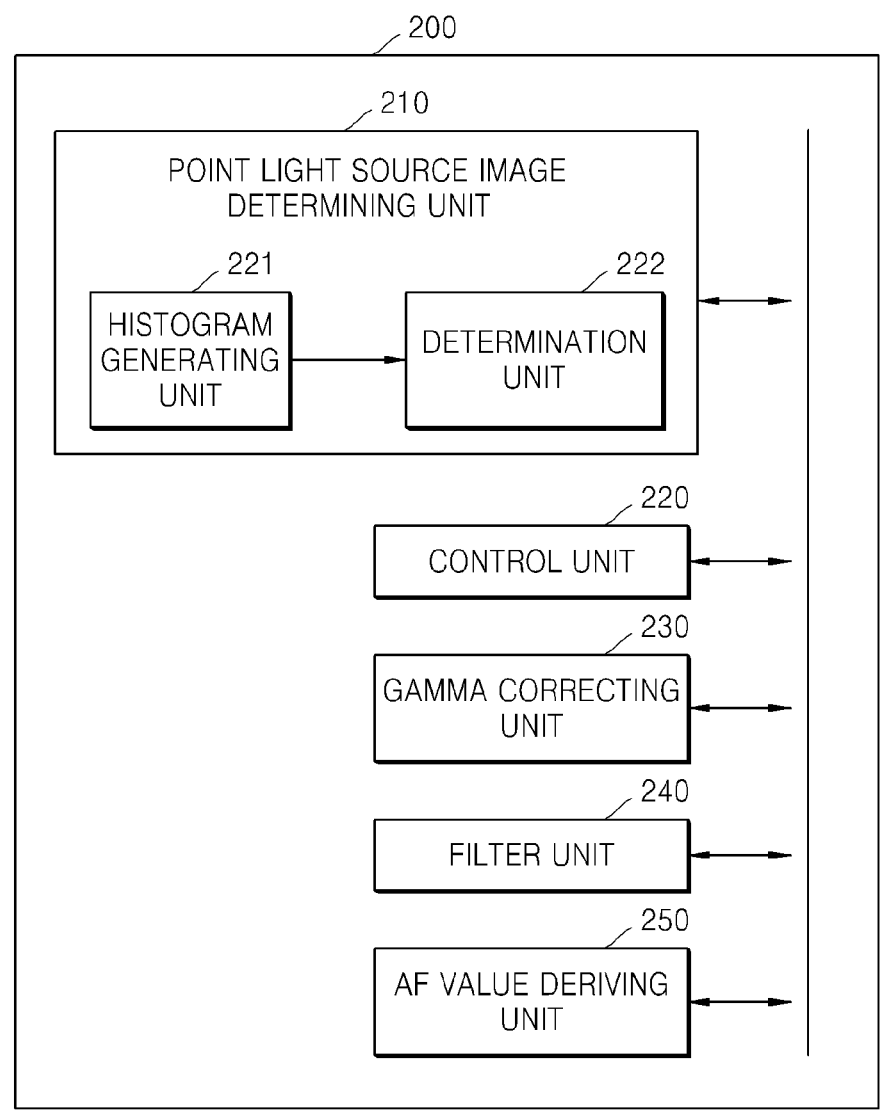
FIG. 4 is a block diagram illustrating an AF controlling unit, according to another embodiment of the invention.

FIG. 4 is a block diagram illustrating an AF controlling unit 200, according to another embodiment of invention.

The AF controlling unit 200 of FIG. 4 may further include a point light source image determining unit 210, compared to the AF controlling unit 100 of FIG. 2. Functions and operations of a control unit 220, a gamma correcting unit 230, a filter unit 240, and an AF value deriving unit 250 of FIG. 4 are substantially the same as those of the control unit 100, the gamma correcting unit 120, the filter unit 130, and the AF value deriving unit 140 of FIG. 2 and thus their detailed description will be omitted.

The point light source image determining unit 210 includes a histogram generating unit 221 and a determination unit 22 and determines whether a point light source is included in an input image or not. In more detail, the histogram generating unit 221 generates a histogram representing a pixel frequency for the brightness of the input image. Here, the brightness of the input image may be expressed with 256 levels, where the highest brightness is level 255 and the lowest brightness is level 0. The determination unit 222 determines that the input image includes a point light source by analyzing the histogram in terms of whether there is a peak only in the low and high brightness regions). Only a low brightness region representing a background and a high brightness region representing a point light source are shown in the histogram since a high brightness point light source is in a low brightness background according to a point light source.

Figure 5:
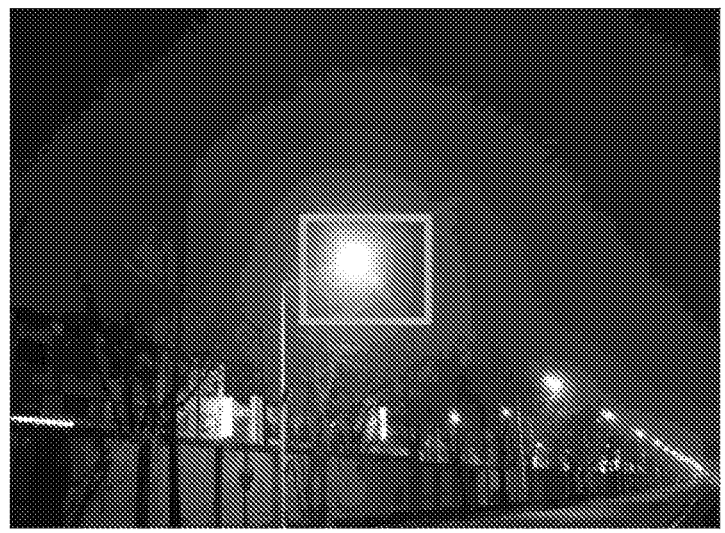
FIG. 5 illustrates an input image including a point light source in a dark environment.

FIG. 5 illustrates an input image including a point light source in a dark environment.

Figure 6:
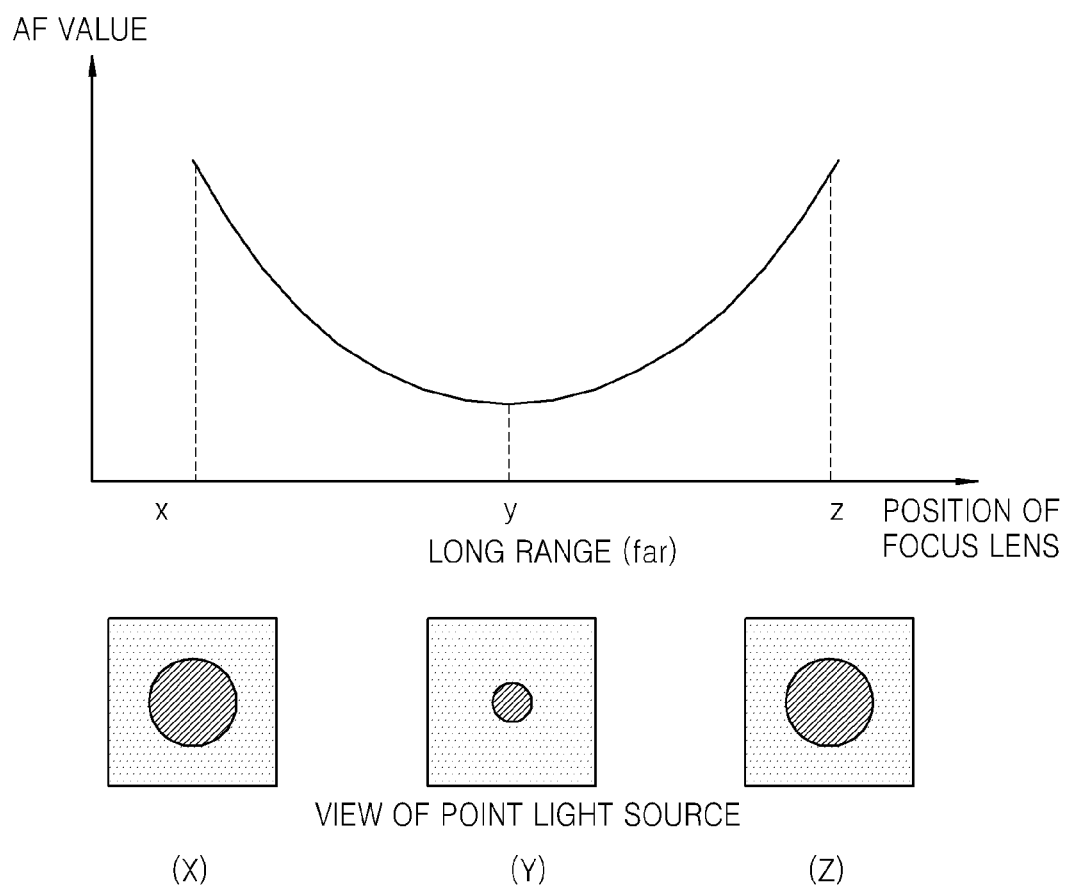
FIG. 6 is a graph illustrating AF values of the image of FIG. 5.

FIG. 6 is a graph illustrating AF values of the image of FIG. 5 according to an embodiment of the invention.

Referring to FIGS. 5 and 6, if an input image includes a point light source, a conventional auto focus adjusting method is limited as described as follows.

The conventional auto focus adjusting method performs an auto focus adjusting operation by deriving AF values according to positions of a focus lens and then positioning the focus lens on a position of the maximum AF value.

Referring to FIG. 6, in a case of the image including a point light source of FIG. 5, according to the graph illustrating AF values of an input image according to a subject's distance, when a position of a focus lens is y, an image Y, which includes a point light source, has a smaller sized point light source and a lower AF value than images X and Z, including a point light source, respectively at positions of the focus lens are x and y. That is, the image including a point light source has a smaller AF value when a focus is adjusted than when the focus is not adjusted. Accordingly, if auto focus is adjusted by positioning the focus lens on a position of the maximum AF value of the graph for a conventional image including a point light source, a blurry image (i.e. out of focus) is obtained. The reason is because the conventional auto focus adjusting method mistakes a point light source (i.e., a long range subject) for a short range subject.

FIG. 7 is a flowchart illustrating an auto focus adjusting method according to an embodiment of the invention.

Referring to FIG. 7, the digital camera 1000 enters into a photographing mode in operation S701.

It is determined whether an auto focus adjustment manipulation signal is inputted or not in operation S702. For example, when a user half-presses a shutter-release button, the auto focus adjustment manipulation signal is inputted. However, embodiments of the invention are not limited thereto, and the digital camera 1000 may generate a manipulation signal for automatically performing an auto focus adjustment. If the auto focus adjustment manipulation signal is not inputted, the digital camera 1000 remains in the photographing mode again.

Once the auto focus adjustment manipulation signal is inputted, the AF controlling unit 100 controls the optical driving unit 12 to change a position of a focus lens and derives an input image from the image capturing device 13 in operation S703. The input image may be derived in a plurality based on a position change of the focus lens. The input image may be a live-view image.

It is determined that the input image includes a point light source or not in operation S704.

If the input image does not include a point light source, the method of this/the present embodiment, the one being described now is terminated in order to apply a conventional auto focus adjusting method. Otherwise, if the input image includes a point light source, the auto focus adjusting method according to the present embodiment of the invention is applied.

In operation S705, a gamma curve is applied to the input image including a point light source to derive a gamma correction image. The gamma curve is non-linear and is expressed as Equation 1 above. The gamma correction image derived by applying the gamma curve to the input image may remove a fake peak according to a unique defocus of the point light source.

Figure 8A:
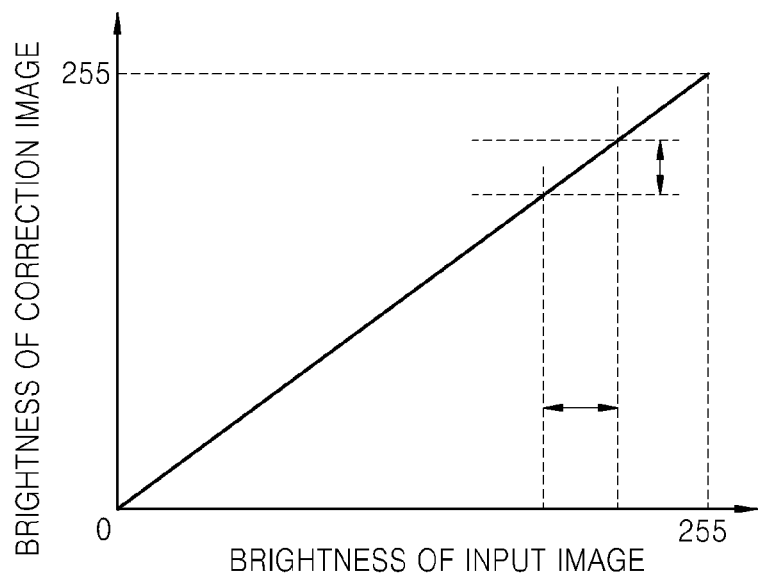
FIG. 8A is a linear graph and FIG. 8B is a graph illustrating a gamma curve according to an embodiment of the invention.
Figure 8B:
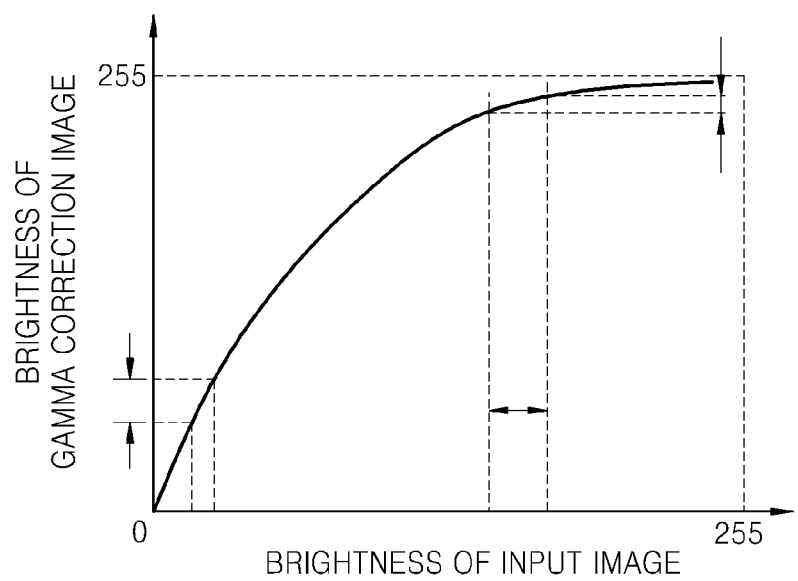

FIG. 8A is a linear graph and FIG. 8B is a graph illustrating a gamma curve according to an embodiment of the invention. In the graphs, x-axes represent brightness of an input image and y-axes represent brightness of a correction image and brightness of a gamma correction image, respectively. The brightness is expressed with 256 levels (i.e., a range of level 0 to level 255).

Referring to FIG. 8A, the brightness of a correction image is expressed without a change in correspondence to the brightness of an input image according to the linear graph. That is, a high brightness component by a point light source is expressed without a change in the correction image, such that errors occur due to the point light source when AF values are derived through the correction image. Referring to FIG. 8B, according to a gamma curve of the non-linear graph, a high brightness component of the input image is compressed in a gamma correction image and then expressed. That is, the high brightness component due to a point light source is reduced in the gamma correction image and expressed, such that a conventional fake peak due to a point light source is reduced in size. However, a low brightness component of an input image is expanded and expressed in the gamma correction image. That is, since the low brightness component (i.e., a noise component) is expanded and expressed typically, a procedure is required to remove a noise component.

Next, noise of the gamma correction image is removed in operation S706. Noise may be removed through the filter unit 130 through coring performed by the filter unit 130. The coring process means a process for removing a signal component corresponding to noise.

Next, an AF value for a position of a focus lens is derived through the gamma correction image. First, a high frequency component is extracted from the gamma correction image, in operation S707. The high frequency component may be obtained through an HPF that passes a frequency higher than a cutoff frequency. Second, after taking an absolute value of the extracted high frequency component, in operation S708, third, an integral unit integrates the absolute value of the high frequency component in the input image such that AF values are derived in operation S709. An operation for deriving AF values may be repetitively performed according to a position of a focus lens and thus, an AF value graph with respect to a focus lens position is obtained. The system controlling unit 40 controls the optical driving unit 12 to incrementally move a focus lens and obtain an AF value, and then fixes the focus lens at a position of the maximum AF value. According to an embodiment of the invention, a user derives and combines AF values for positions of a focus lens with respect to an input image including a point light source. Then, the focus lens is positioned in a position of the maximum AF value, such that an auto focus adjustment on the input image including a point light source in a dark environment can be performed.

Figure 9:
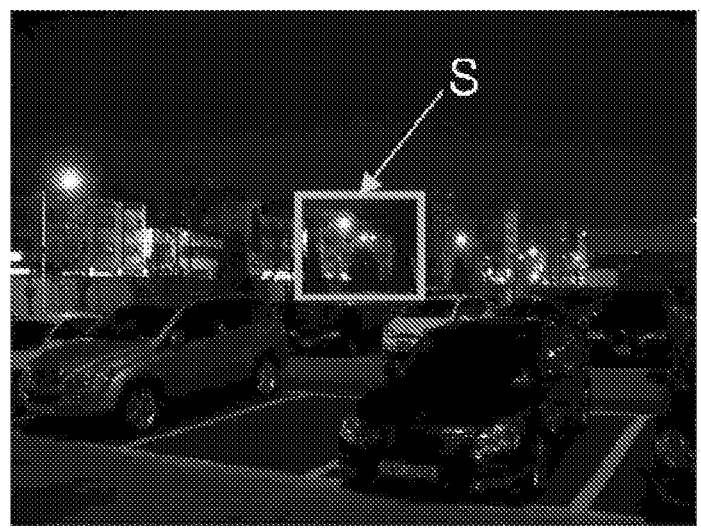
FIG. 9 illustrates an input image including a point light source in a dark environment, according to an embodiment of the invention.

FIG. 9 illustrates an input image including a point light source in a dark environment, according to an embodiment of the invention. The point light source is indicated with a box S.

Figure 10:
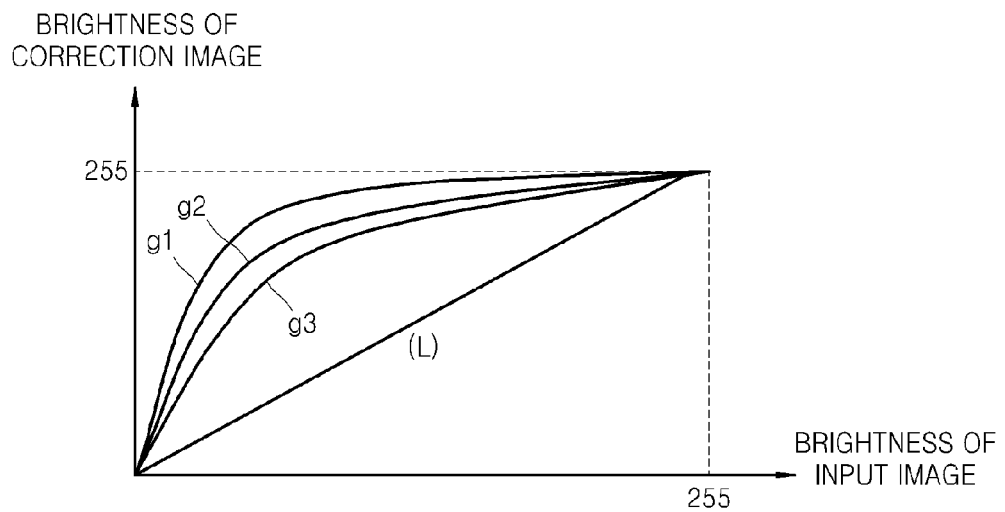
FIG. 10 illustrates a gamma curve to be applied to an input image and a linear graph.

FIG. 10 illustrates gamma curves g1, g2, and g3 to be applied to an input image and a linear graph. In FIG. 10, an x-axis represents brightness of an input image in a range of level 0 to level 255. A y-axis represents brightness of an image corrected by a gamma curve or a linear graph in a range of a level 0 to a level 255. In a case of the linear graph L, the brightness of a linearly changed correction image with respect to brightness of an input image is provided. In a case of gamma curves g1, g2, and g3, they may be variously derived according to the type of a gamma value y, but the brightness of a gamma correction image is provided, which non-linearly changes by typically compressing a high brightness component and expanding a low brightness component of the brightness of the input image. Accordingly, a gamma curve according to an embodiment of the invention may have a gamma value $\gamma$ in a range of more than 0 and less than 1.

Figure 11:
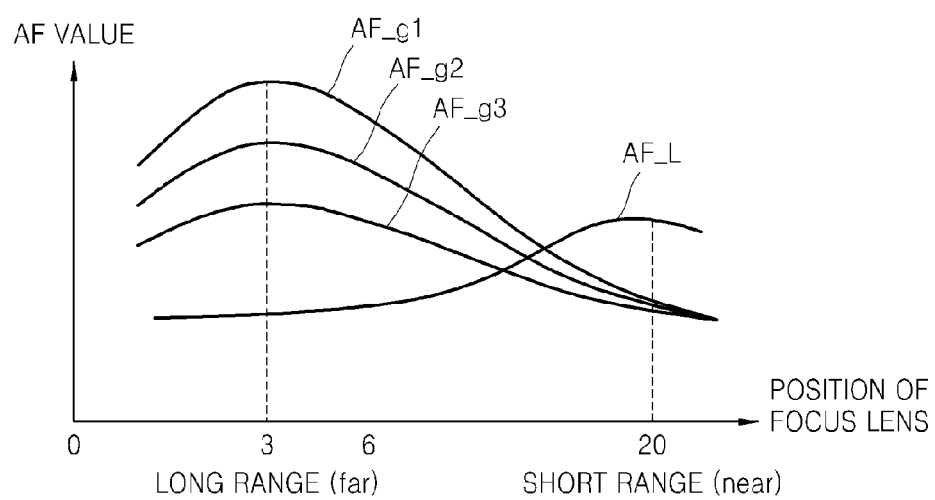
FIG. 11 is an AF value graph with respect to a position of a focus lens obtained by applying FIG. 10 to the input image of FIG. 9 according to an embodiment of the invention.

FIG. 11 is an AF value graph with respect to a position of a focus lens obtained by applying the gamma curves g1, g2, and g3 of FIG. 10 to the input image of FIG. 9, according to an embodiment of the invention. In FIG. 11, an x-axis represents a position of a focus lens in a range of n levels (n is a positive integer). A y-axis represents is an AF value. Here, a level value representing a position of a focus lens is just an example for convenience of description and is not intended to limit embodiments of the invention.

According to FIG. 9, when a position of a focus lens is a position where a long range subject is focused, i.e. a level of about 3 in FIG. 11, auto focus is optimized. In FIG. 11, a point where an AF value is a maximum in each AF value graph is a point where a focus lens is positioned. Referring to FIG. 11, according to an AF value graph AF_L obtained through the linear graph L, when a position of a focus lens for a short range subject is a level of about 20 of FIG. 11, an AF value is represented with the maximized value. That is, the AF value graph AF_L obtained through the linear graph L does not position a focus lens at a position where a long range subject (i.e., a point light source) is clearly seen, such that AF adjustment cannot be successfully performed. However, the AF value graphs obtained through the gamma curves g1, g2, and g3 have a maximum AF value at a position of a focus lens where a long range subject is focused completely. As a result, according to an embodiment of the invention, accurate AF adjustment can be performed.

Figure 12:
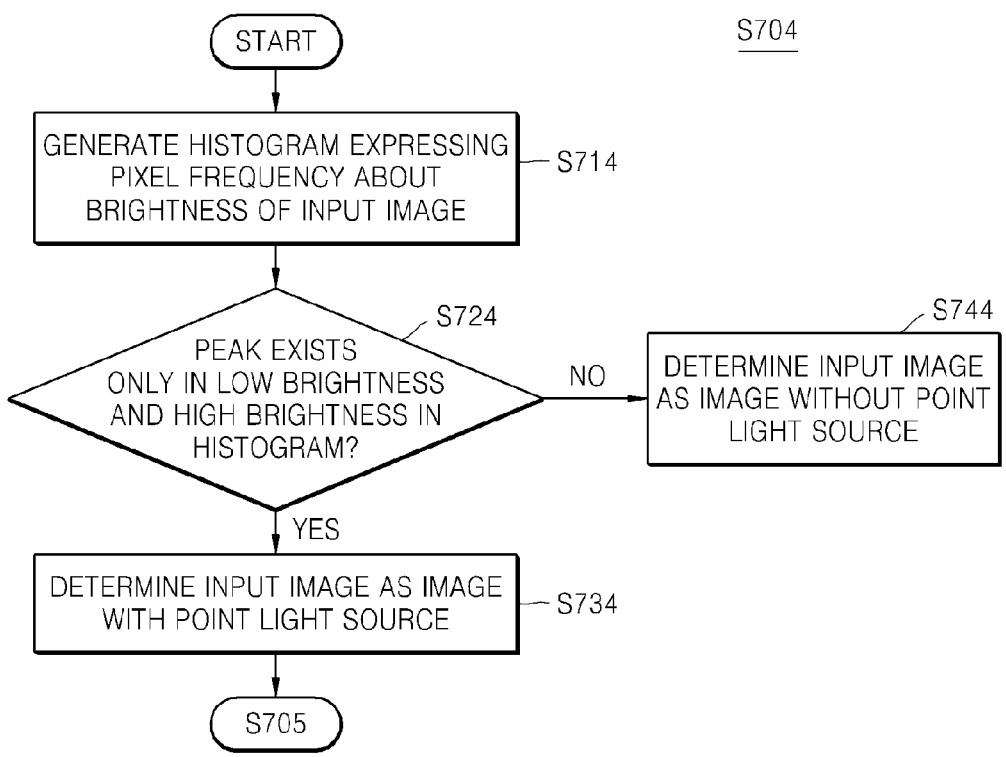
FIG. 12 is a detailed flowchart of operation S704 of FIG. 7 according to an embodiment of the invention.

FIG. 12 is a detailed flowchart of operation S704 of FIG. 7, according to an embodiment of the invention.

Operation 704 of the embodiment of the invention has a property that a gamma curve is applied to an input image including a point light source in a dark environment, and thus requires an operation for determining whether an input image includes a point light source or not. FIG. 13 illustrates various histogram patterns, according to embodiments of the invention. Referring to FIG. 13, a histogram representing a pixel frequency about brightness in an input image derived from an image capturing device is generated in operation S714. An x-axis of the histogram represents brightness levels of 1 to 255, and a y-axis represents a pixel frequency corresponding to the brightness.

FIG. 13 illustrates various histogram patterns.

Figure 13A:
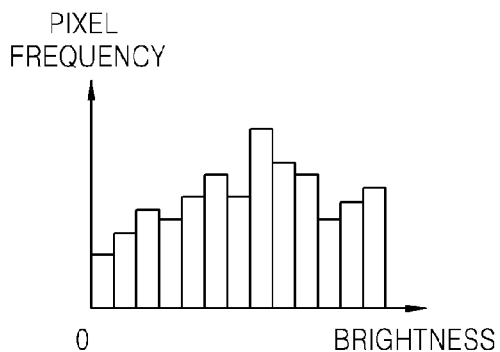
FIG. 13 illustrates various histogram patterns according to embodiments of the invention.
Figure 13B:
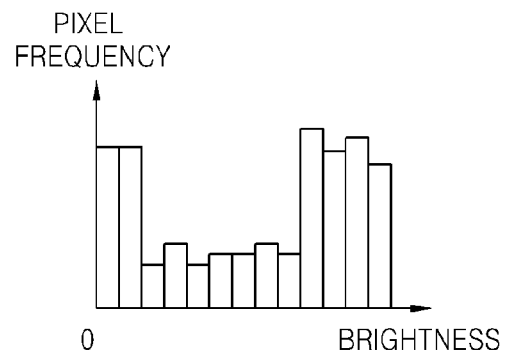

Referring to FIG. 13(a), a general image has various peaks in an entire range of brightness. According to light, there may be pixels where low brightness, intermediate brightness, and high brightness are expressed. However, an image including a point light source in a dark environment has only a low brightness and a high brightness in a histogram, as shown in FIG. 13(b). The reason is that an image including a point light source in a dark environment, according to an embodiment of the invention, means an image where a background of a low brightness and a point light source of a high brightness are mainly expressed.

In operation S724, it is confirmed that there are peaks only in low and high brightness in the generated histogram. Here, the peak may indicate a portion where a pixel frequency of more than a reference pixel frequency that a user designates is shown. The reference pixel frequency may be programmed during the manufacturing of a device, or may be changed by a user, if necessary. As the reference pixel frequency is greater than others, an image with a bright point light source in a dark background is detected. According to the confirmation result, if there are peaks only in low and high brightness in the histogram, it is determined that the input image includes a point light source in operation S734 and then a gamma curve is applied, in operation S705. However, according to the confirmation result, if there is no peak only in low and high brightness but there are peaks in various brightnesses in the histogram, it is determined that the input image does not include a point light source, in operation S744 and then a gamma curve is not applied.

Figure 14:
FIG. 14 illustrates an image with another a point light source.

FIG. 14 illustrates an image with another point light source. In order to confirm an effect of an AF adjusting method according to an embodiment of the invention, an image only with a point light source of high brightness in a background of low brightness is used as an example.

Figure 15:
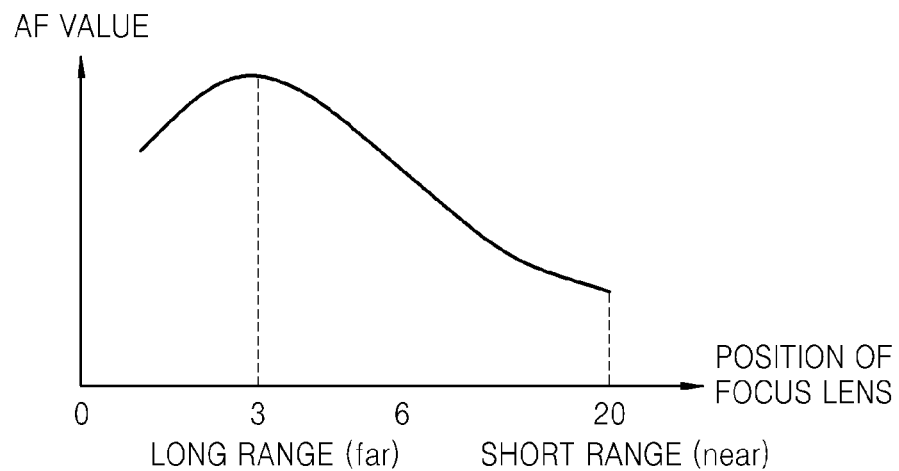
FIG. 15 is a graph illustrating an AF value to which a non-linear gamma curve is applied.

FIG. 15 is a graph illustrating an AF value to which a non-linear gamma curve is applied. That is, FIG. 15 illustrates a graph in which after it is determined that the image of FIG. 14 is an image including a point light source in a dark environment or not through a histogram analysis, various gamma curves are applied, the image passes through a high pass filter of a high cutoff frequency, and an AF value about a position of a focus lens is repetitively derived and the result is represented.

Figure 16:
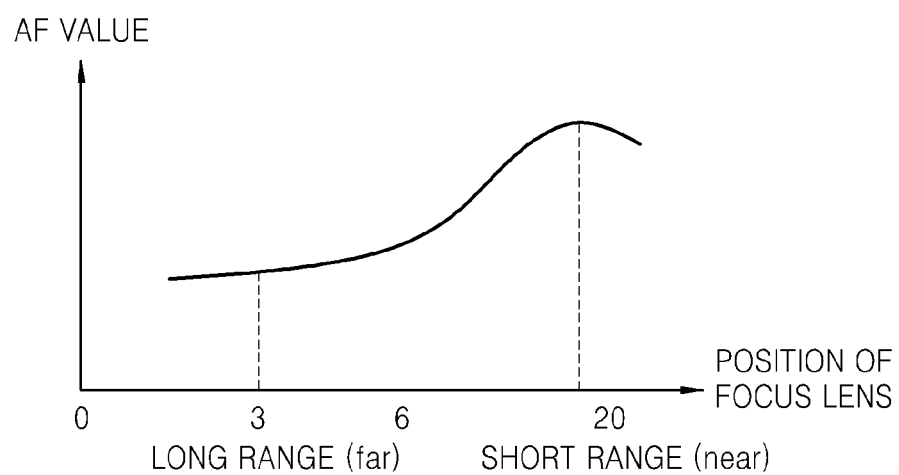
FIG. 16 is a graph about an AF value to which a linear graph is applied.

FIG. 16 is a graph about an AF value to which a linear graph is applied. That is, FIG. 16 is a graph in which after a linear graph, instead of a gamma curve, is applied to the image of FIG. 14, the image passes through a high pass filter of a low cutoff frequency, and an AF value about a position of a focus lens is repetitively derived and the result is represented. For reference, the x-axes of FIGS. 15 and 16 represent a position of a focus lens in a range of level 0 to level 20 by one level, and the y-axes represent an AF value. Here, a level value representing a position of a focus lens is just an example for convenience of description and is not intended to limit embodiments of the invention.

In order to capture a clear image of the image of FIG. 14, when a position of a focus lens is a position where a long range subject is focused, the maximum AF value needs to be represented. In FIG. 15, a peak position where the AF value is the maximum is shown when a position of a focus lens is a position where a long range subject is focused, for example, a level of about 3 of FIG. 15. Accordingly, when a focus lens is positioned at position where a long range subject is focused, as shown in FIG. 15, an image including a point light source in a dark environment (i.e., a long range subject) is captured clearly. However, In FIG. 16, a peak position is shown when a position of a focus lens is a position where a short range subject is focused, for example, a level of about 20 of FIG. 16. Accordingly, if a focus lens is positioned according to FIG. 16, an image with a point light source of a long range subject cannot be clearly captured.

According to an embodiment of the invention, conventional limitations in focusing an image including a point light source in a dark environment are resolved to capture a clear image including a point light source in a dark environment.

In addition, according to an embodiment of the invention, when auto focus is adjusted on an image including a point light source in a dark environment, without additional complex operations, a gamma curve is introduced such that fast and accurate auto focus can be adjusted.

Moreover, embodiments of the invention can also be embodied as computer readable codes on a computer readable recording medium. The computer readable recording medium is any data storage device that can store data which can be thereafter read by a computer system. The computer readable recording medium may be limited to physical medium.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing embodiments of the invention can be easily construed by programmers skilled in the art to which embodiments of the invention pertains.

Until now, exemplary embodiments of the invention are described mainly. It will be understood by those skilled in the art that various changes in form and details may be made therein without departing from the spirit and scope of embodiments of the invention as defined by the appended claims. Therefore, the exemplary embodiments should be considered in descriptive sense only and not for purposes of limitation.

All references, including publications, patent applications, and patents, cited herein are hereby incorporated by reference to the same extent as if each reference were individually and specifically indicated to be incorporated by reference and were set forth in its entirety herein.

What is claimed is:

1. An auto focus adjusting method comprising:
   deriving an input image from an image capturing device by changing a position of a focus lens;
   deriving a gamma correction image by applying a gamma curve to the input image;

determining whether or not the input image includes a point light source, and if it is determined that the input source image does not include the point light source, then deriving an auto focus (AF) value from the input image; and deriving the auto focus (AF) value for the position of the focus lens using the gamma correction image if the input image includes the point light source.

2. The method of claim 1, further comprising:
removing noise from the gamma correction image.

3. The method of claim 1, wherein the gamma curve is non-linear.

4. The method of claim 1, wherein the gamma curve is expressed as $$s = cr^\gamma$$

wherein s is a brightness of the gamma correction image, c is a positive number, r is a brightness of the input image, and $\gamma (0 < \gamma < 1)$ is an adjustment.

5. The method of claim 1, wherein the input image is a live-view image.

6. The method of claim 1, wherein the determining whether or not the input image includes the point light source comprises:
generating a histogram that expresses a pixel frequency about brightness of the input image; and
determining the input image as an image including the point light source in a dark environment when there is a peak in low brightness and high brightness in the histogram.

7. The method of claim 2, wherein the removing of noise of the gamma correction image comprises removing noise through coring.

8. The method of claim 1, wherein the deriving of the AF value for the position of the focus lens through the gamma correction image comprises:
extracting a high frequency component of the gamma correction image;
taking an absolute value of the high frequency component; and
deriving the AF value for the position of the focus lens by taking an integral of the absolute value.

9. The method of claim 8, wherein the extracting of the high frequency component comprises extracting a high frequency component with a high pass filter (HPF) of which a cutoff frequency is a high frequency.

10. A non-transitory computer-readable storage medium having embodied thereon computer program codes that, when executed, cause a machine to at least:
change a position of a focus lens and derive an input image from an image capturing device;
derive a gamma correction image by applying a gamma curve to the input image;
determine whether or not the input image includes a point light source, and if it is determined that the input source image does not include the point light source, then deriving an auto focus (AF) value from the input image; and derive the auto focus (AF) value about the position of the focus lens using the gamma correction image if the input image includes the point light source.

11. An auto focus adjusting device comprising:
a control unit that derives an input image from an image capturing device by changing a position of a focus lens;
a gamma correction unit that derives a gamma correction image by applying a gamma curve to the input image;
a point light source image determining unit that determines whether or not the input image includes a point light source; and
an auto focus (AF) value deriving unit that derives an AF value about the position of the focus lens using the gamma correction image if the input image includes the point light source and using the input image if the input image does not include the point light source.

12. The auto focus adjusting device of claim 11, further comprising:
a filter unit that removes noise of the gamma correction image.

13. The auto focus adjusting device of claim 11, wherein the gamma curve is non-linear.

14. The auto focus adjusting device of claim 11, wherein the gamma curve is expressed as $$s = cr^\gamma$$

wherein s is a brightness of the gamma correction image, c is a positive number, r is a brightness of the input image, and $y\ (0 < \gamma < 1)$ is an adjustment.

15. The auto focus adjusting device of claim 11, wherein the input image is a live-view image.

16. The auto focus adjusting device of claim 11, wherein the point light source image determining unit comprises:
a histogram generating unit that generates a histogram that expresses a pixel frequency about brightness of the input image; and
a determination unit that determines the input image as an image including the point light source in a dark environment when there is a peak only in low brightness and high brightness in the histogram.

17. The auto focus adjusting device of claim 12, wherein the filter unit is that removes noise through coring.

18. The auto focus adjusting device of claim 11, wherein the AF value deriving unit comprises:
a high frequency component extracting unit that extracts a high frequency component of the gamma correction image;
an absolute value deriving unit that takes an absolute value of the high frequency component; and
an integral unit that derives the AF value about the position of the focus lens by taking an integral of the absolute value.

19. The auto focus adjusting device of claim 18, wherein the high frequency component extracting unit is a high pass filter (HPF) of which a cutoff frequency is a high frequency.

* * * * *